(12) United States Patent
Deseure et al.

(10) Patent No.: US 10,569,899 B2
(45) Date of Patent: Feb. 25, 2020

(54) METHOD FOR CONTROLLING THE RESTITUTION OF ALERT(S) AND/OR SYSTEM(S) RECONFIGURATION PROCEDURE(S), RELATED COMPUTER PROGRAM PRODUCT AND CONTROL SYSTEM

(71) Applicant: THALES, Courbevoie (FR)

(72) Inventors: Chris Deseure, Toulouse (FR);
Laurent Flotte, Toulose (FR);
Guillaume Urbanski, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/141,217

(22) Filed: Sep. 25, 2018

(65) Prior Publication Data

US 2019/0118965 A1    Apr. 25, 2019

(30) Foreign Application Priority Data

Oct. 20, 2017  (FR) ..................................... 17 01092

(51) Int. Cl.
*G08B 21/00* (2006.01)
*B64D 45/00* (2006.01)
(Continued)

(52) U.S. Cl.
CPC ................ B64D 45/00 (2013.01); B64F 5/60 (2017.01); G05B 23/027 (2013.01);
(Continued)

(58) Field of Classification Search
CPC ........ B64D 45/00; B64D 43/00; B64D 15/20; G08G 5/0047; G08G 5/0091; G08G 5/0004; G05B 23/027; G05B 23/0272
See application file for complete search history.

(56) References Cited

U.S. PATENT DOCUMENTS 9,950,808 B2 *  4/2018  Guilley .................. B64D 45/00
10,023,324 B2 *  7/2018  Jayathirtha ............ B64D 45/00
(Continued)

FOREIGN PATENT DOCUMENTS

FR    2935818 A1    3/2010
FR    2940482 A1    6/2010
(Continued)

OTHER PUBLICATIONS

French Search Report issued in connection with French Application No. FR 1701092, dated Jun. 4, 2018, 2 pages.

*Primary Examiner* — Toan N Pham
(74) *Attorney, Agent, or Firm* — Duane Morris LLP

(57) ABSTRACT

The invention relates to a method for controlling the restitution of alert(s) and/or of system(s) reconfiguration procedure(s), including the surveillance of device(s) of a vehicle and the determination of alert(s) and/or of associated reconfiguration procedure(s) to be restituted for the crew, the vehicle operating according to a mission carried out by using at least one operational capacity,
and further including, for a current mission:
  obtaining a list of operational capacities required by said current mission;
  from said required operational capacities and at least one piece of information from an accessible database, controlling the restitution of alert(s) and/or of system(s) reconfiguration procedure(s) by:
    modifying the associated level of alert(s) and/or of procedure(s), and sequencing the restitution of alert(s) and/or of procedure(s) based on said level, and/or
    filtering said alert(s) and/or reconfiguration procedure(s) before restitution.

10 Claims, 3 Drawing Sheets

(51) Int. Cl.
*G06Q 10/06* (2012.01)
*G06Q 50/30* (2012.01)
*B64F 5/60* (2017.01)
*G05B 23/02* (2006.01)

(52) U.S. Cl.
CPC ..... *G05B 23/0272* (2013.01); *G06Q 10/0631* (2013.01); *G06Q 50/30* (2013.01); *G05B 2219/45071* (2013.01)

(56) References Cited

U.S. PATENT DOCUMENTS

| | | | |
|---|---|---|---|
| 10,099,801 B2 * | 10/2018 | Thomas | B64D 45/00 |
| 2010/0066565 A1 | 3/2010 | Francois et al. | |
| 2010/0161157 A1 | 6/2010 | Guilley et al. | |
| 2017/0129621 A1 | 5/2017 | Flotte et al. | |

FOREIGN PATENT DOCUMENTS

| | | | |
|---|---|---|---|
| FR | 2965947 A1 | 4/2012 | |
| FR | 3043474 A1 | 5/2017 | |

* cited by examiner

METHOD FOR CONTROLLING THE RESTITUTION OF ALERT(S) AND/OR SYSTEM(S) RECONFIGURATION PROCEDURE(S), RELATED COMPUTER PROGRAM PRODUCT AND CONTROL SYSTEM

The present invention relates to a method for controlling the restitution of alert(s) and/or of system(s) reconfiguration procedure(s) to aid the piloting of a vehicle, such as an aircraft, or the piloting of a drone (aerial, land-based or marine), and an associated computer program product.

The present invention also relates to a system for controlling the restitution of alert(s) and/or of system(s) reconfiguration procedure(s).

Hereinafter, we will consider the example where the vehicle is aerial, for example an aircraft. "Aircraft" refers to a moving vehicle piloted by at least one pilot, and in particular able to fly in the Earth's atmosphere, such as an airplane, helicopter or drone.

The aircraft includes a plurality of systems that can be used by the pilot to operate the aircraft. "System" refers to a device that is at least partially electronic or a combination of such devices, onboard the aircraft and able to carry out one or several functions making it possible to operate the aircraft.

The invention more particularly makes it possible to help the pilot prioritize the tasks associated with abnormal situations caused by a malfunction of one or several systems during the operation of the aircraft and reduce the number or priority thereof so as to obtain, as a result, an easing of such abnormal situations for the crew, generally synonymous with stress.

Among the set of systems of an aircraft, there is generally at least one surveillance system of the FWS (Flight Warning System) type making it possible to monitor the operation of the other systems and to detect any malfunction thereof.

When no malfunction of the monitored system is detected, the surveillance system assigns that system the normal operating state.

When a malfunction of the monitored system is detected, the surveillance system assigns that system the faulty operating state.

In the latter case, the surveillance system can notify the pilot of the detected malfunction in particular by generating an alert corresponding to the associated deterioration or loss of function. Certain surveillance systems further make it possible to the pilot a procedure for reconfiguring one or several systems to offset this malfunction and return it to a "safe" situation in terms of flight safety.

This is in particular the case for a surveillance system known as "Flight Warning System (FWS), which is onboard most current aircraft.

Systems of the FWS type in particular make it possible to monitor the majority of the systems of the aircraft.

With the increased complexity of systems and the growing number of interconnections and dependencies between the systems, the number of the functions that may appear simultaneously in the systems is growing considerably. Furthermore, a malfunction in a given system may cause multiple malfunctions in systems depending on it.

According to the current flight alert systems, the criticality of an alert is determined statically by an analysis done during the design of the system and the airplane. This analysis is done considering all of the missions of the aircraft, and therefore the worst case scenario.

When a failure occurs on one of the systems, the alert level that is escalated may therefore be completely de-correlated from the mission. In other words, the detected failure is sometimes not essential to the proper performance of the mission. The generation and restitution of the corresponding alert is therefore needless relative to the mission being performed, and in this case a source of stress that is also needless and synonymous with a workload for the crew, who must analyze the alert and how to handle it with the mission context in mind. The consequences of this drawback of the current alert system are compounded in case of multiple failures, the crew then being alone and buried under the mass of data to be processed and sorted in order to sort out what is necessary and what is superfluous for the mission to be carried out, potentially causing them to lose sight of the overall state of the vehicle.

One aim of the invention is therefore to offset these drawbacks by proposing an improved automated management of alert restitution such that the criticality level of the alerts is adapted to the current flight context (i.e., the mission in progress) in order to decrease the workload and stress typically weighing on the crew in abnormal situations.

To that end, the invention relates to a method for controlling the restitution of alert(s) and/or of system(s) reconfiguration procedure(s), the method including the surveillance of the operation of one or several device(s) of a vehicle capable of moving between two distinct points and the determination of alert(s) and/or of associated reconfiguration procedure(s) to be restituted for the crew or for at least one pilot of the vehicle, the vehicle being capable of operating according to at least one mission selected from among a plurality of missions, the mission corresponding to a sequence of operational tasks carried out by using at least one operational capacity associated with said mission, the method further including, for a current mission, the following steps:

obtaining a list of operational capacities required by said current mission;

based on said required operational capacities, and from at least one piece of information stored in an accessible database, checking the restitution of alert(s) and/or of system(s) reconfiguration procedure(s) by:

modifying the associated level of alert(s) and/or of reconfiguration procedure(s) derived from the surveillance, and sequencing the restitution for the crew of alert(s) and/or of procedure(s) based on said level, and/or filtering said alert(s) and/or reconfiguration procedure(s) before restitution to the crew.

According to specific embodiments, the control method includes one or more of the following features, considered alone or according to any technically possible combinations:

in the database, each operational capacity is associated, by flight phase, with a list of groups of elements to which an alert and/or a reconfiguration procedure may relate, the modification and/or the filtering including:

detecting the operational capacity or capacities affected by the alert and/or by the reconfiguration procedure, the first comparison of said affected operational capacities to said required operational capacity or capacities, and the second comparison of said affected operational capacities to a set of basic operational capacities continuously required for the proper operation of the vehicle;

when the first comparison of said affected operational capacities to said required operational capacity or capacities is negative, the method includes decreasing the level of alert(s) and/or of reconfiguration procedure(s) derived from the surveillance, by applying a predetermined degradation law stored beforehand in a configuration file of the vehicle;

when the first comparison of said affected operational capacities to said required operational capacity or capacities is positive, and when the capacity or capacities both affected and required are independent of the current moment of the mission, the conservation of the level of alert(s) and/or of reconfiguration procedure(s) is implemented;

the database further includes, for each operational capacity, information representative of its usage period during the current mission, and in which the method includes taking this information into account to control the restitution of alert(s) and/or of avionics procedure(s);

when the first comparison of said affected operational capacities to said required operational capacity or capacities is positive, and when, at a current moment, the information representative of the usage period of the capacity or capacities both affected and required indicates a usage after the current moment during the mission, the conservation of the level of alert(s) and/or of reconfiguration procedure(s) is implemented;

when the first comparison of said affected operational capacities to said required operational capacity or capacities is positive, and when, at a current moment, the information representative of the usage period of the capacity or capacities both affected and required indicates a completed usage relative to the current moment, the method includes decreasing the level of alert(s) and/or reconfiguration procedure(s) derived from the surveillance, by applying the predetermined degradation law stored beforehand in the configuration file of the vehicle;

when the second comparison of the affected operational capacities to a set of basic operational capacities is positive, the conservation of the level of alert(s) and/or of reconfiguration procedure(s) is carried out.

The invention also relates to a computer program product including software instructions which, when implemented by an information processing unit integrated into an aircraft or offboard (in particular in the case of a drone, for example), implements a control method as defined above.

The invention also relates to a system for controlling the restitution of alert(s) and/or of system(s) reconfiguration procedure(s), the system being connectable to a system for the surveillance of the operation of one or several device(s) of a vehicle capable of moving between two distinct points, the system for the surveillance of the operation being capable of carrying out the determination of alert(s) and/or of associated reconfiguration procedure(s) to be restituted for the crew or at least one pilot of the vehicle, the vehicle being capable of operating according to at least one mission selected from among a plurality of missions, the mission corresponding to a sequence of operational tasks carried out by using at least one operational capacity associated with said mission, for carrying out a current mission, the control system being capable of:
obtaining a list of operational capacities required by said current mission;
based on said required operational capacity or capacities, and from at least one piece of information stored in a database accessible by the control system, the system is also capable of:
modifying an associated level of alert(s) and/or of reconfiguration procedure(s) delivered by the surveillance system, and ordering the restitution for the crew of alert(s) and/or of procedure(s) based on said level, and/or
filtering said alert(s) and/or reconfiguration procedure(s) before restitution to the crew.

The invention and its advantages will be better understood upon reading the following detailed description of one particular embodiment, provided solely as a non-limiting example, this description being done in reference to the appended drawings, in which.

Figure 2:
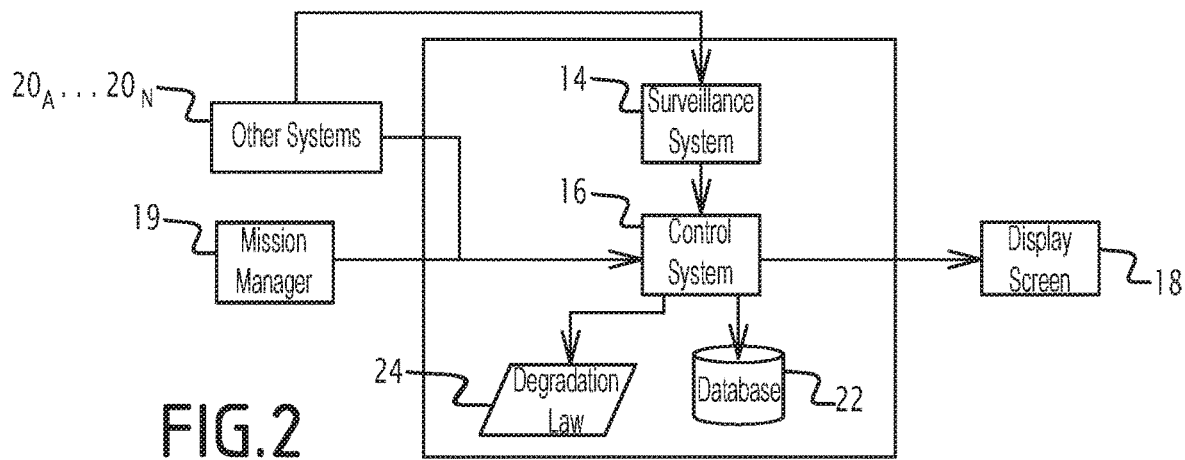
FIGS. 2 and 3 are schematic views of the different example embodiments of systems for controlling the restitution of alert(s) and/or of system(s) reconfiguration procedure(s) according to the invention.
Figure 3:
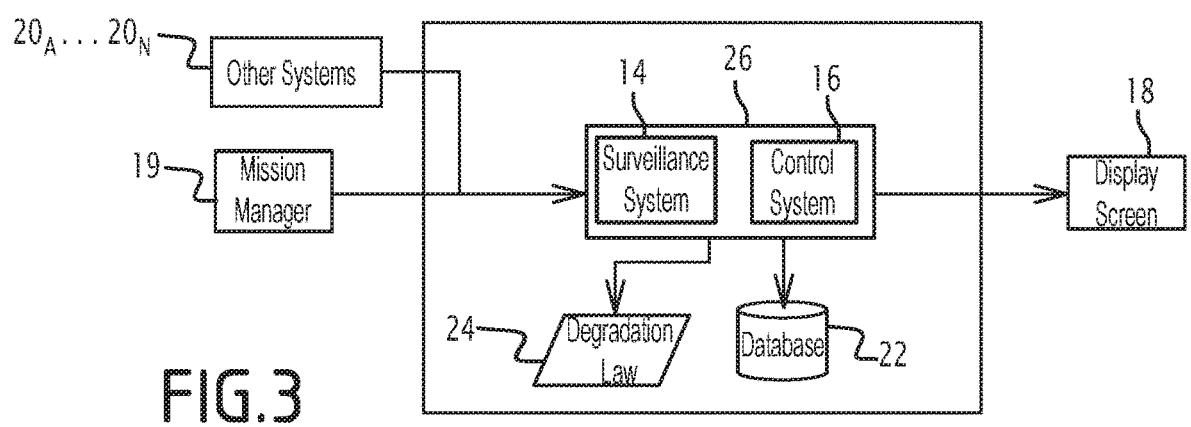
Figure 6:
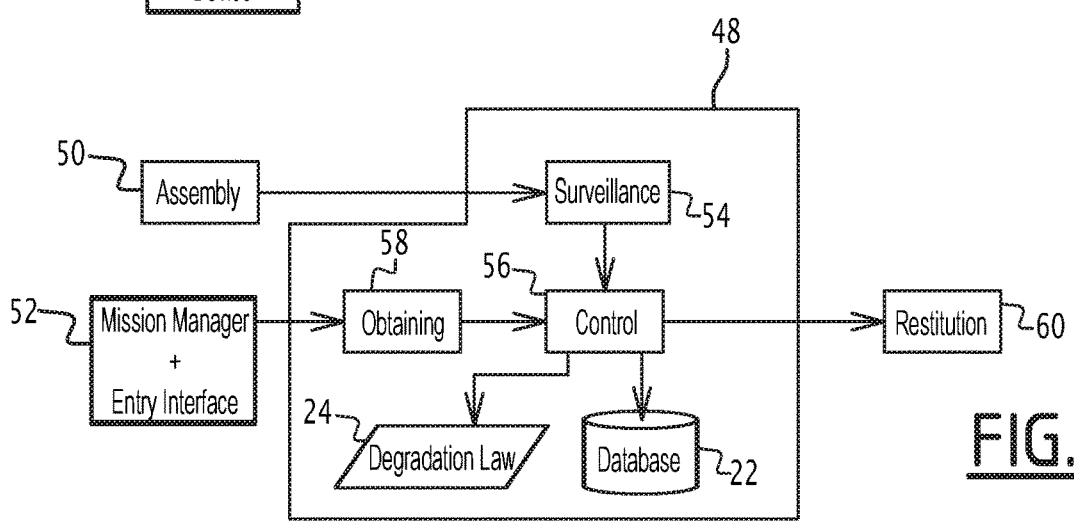
Figure 7:
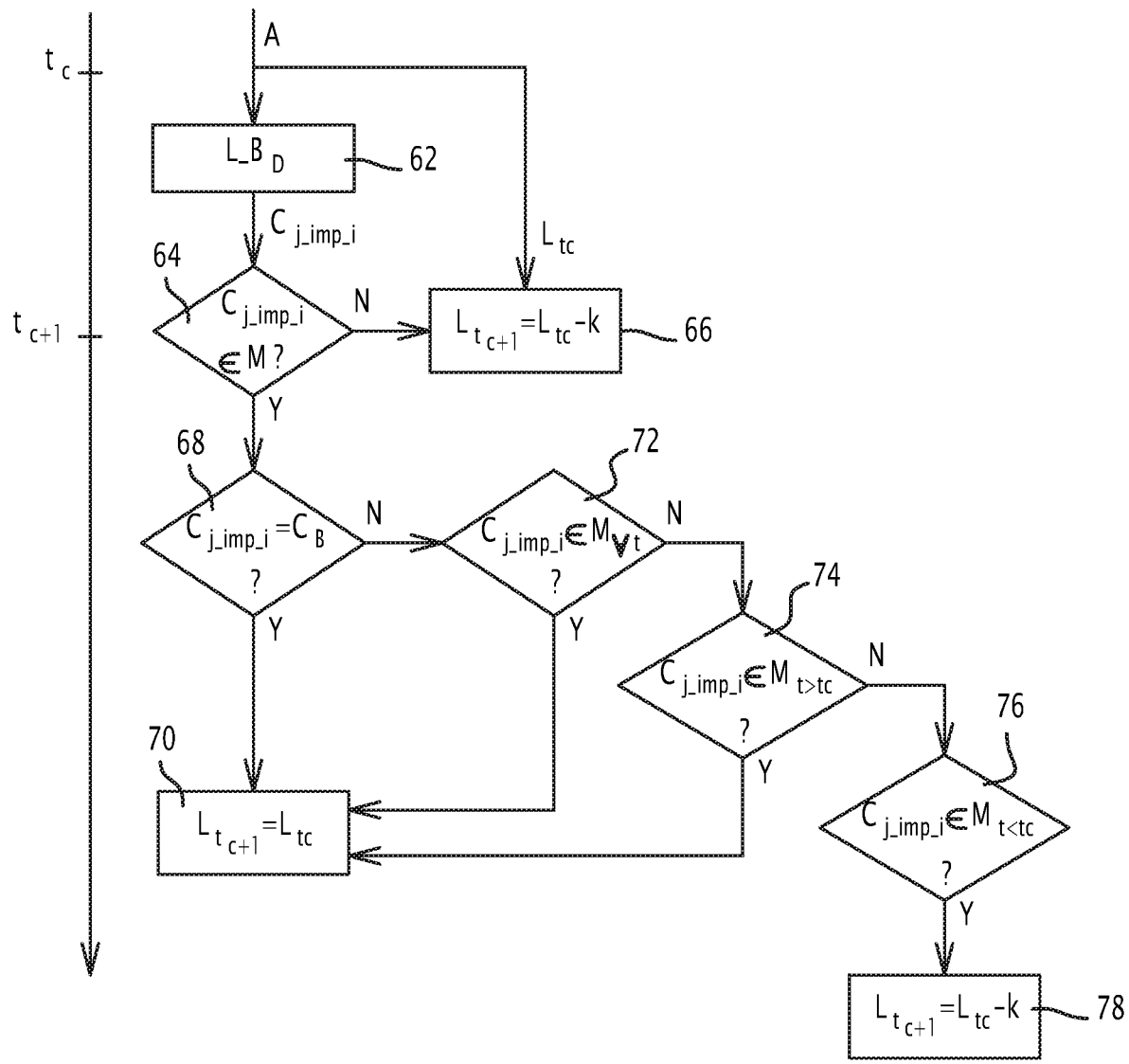

FIGS. 6 and 7 respectively correspond to a flowchart of a method for controlling the restitution of alert(s) and/or of system(s) reconfiguration procedure(s) implemented by the control system of FIG. 2 or 3, and FIG. 7 corresponds to a flowchart of one of its steps.

Figure 1:
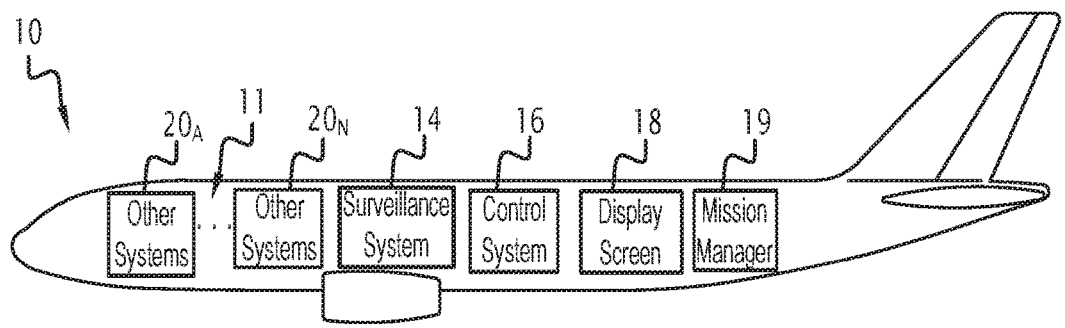
FIG. 1 is a schematic view of an aircraft in particular including a surveillance system, a display monitor and a pilot decision aid system for piloting of an aircraft according to the invention.

In the example embodiment of FIG. 1, the aircraft 10 is for example an airplane able to be piloted by at least one pilot.

Alternatively, the aircraft 10 is a helicopter, or a drone piloted remotely by a pilot.

In a known manner, the operation of the aircraft 10 comprises a maintenance phase piloted by the or by each maintenance operator, and a mission phase piloted by the or each pilot of a crew. The mission phase includes flight phases and/or operational phases where actions of the load winching type or identification type are carried out. Each flight phase is in particular chosen from among the group consisting of at least: a rolling (taxi) phase, a takeoff phase, an ascent phase, a cruising phase, a decent phase and a landing phase.

Any operation of the aircraft 10 having a defined purpose constitutes a mission M of the aircraft 10. Thus, for example, when the aircraft 10 is an airliner, one of its possible missions M is to transport passengers from one city to another. In this example, the mission M is defined by the corresponding airline.

The aircraft 10 is able to move during its mission M under the influence of outside conditions. These outside conditions for example comprise weather conditions or air traffic in the area around the aircraft 10.

The aircraft 10 includes a set of systems 11 making it possible to operate the aircraft 10.

"System" refers to a device that is at least partially electronic or a combination of such devices, onboard the aircraft 10 and able to carry out one or several function(s) or capacities making it possible to operate the aircraft 10.

"Function" refers to operations (path calculation, position calculation, following a path, etc.) that contribute to various degrees to the achievement of "capacities" (for example, a category three "CAT III" capacity, a communication capacity combining three functions such as high-frequency HF communication, BHF communication and satellite communication) capable of offering "services" to a user, for example an automatic landing service without visibility.

Examples of such systems in particular include a flight management system (FMS) or a traffic alert and collision avoidance system (TCAS) having combinations of different mechanical and electronic devices, or landing gear or any type of slats and flaps having different combinations of mechanical devices.

Each system of the set of systems 11 is able to operate in a plurality of configurations. In each configuration, a system is able to carry out a function determined by that configuration. The configuration of a system at a given moment is hereinafter referred to as the "current configuration" of that system.

Each system of the set of systems 11 is associated with a plurality of operating parameters characterizing its current configuration. Each operating parameter is for example able to assume a numerical value to characterize the current configuration of the corresponding system.

Thus, the operating parameters have different numerical values for different configurations of the corresponding system.

For example, an operating parameter associated with a flap corresponds to different configurations of that flap, such as the open flap or retracted flap. This operating parameter is for example able to assume a numerical value corresponding to the opening angle of that flap to characterize its current configuration.

The set of systems 11 used by the pilot to operate the aircraft 10 at a given moment, the current configurations of these systems at that moment and the current outside conditions of the aircraft 10 at that moment form a movement context, or current flight context, of the aircraft 10. The aircraft 10 is thus able to move during its mission in different movement contexts corresponding to different systems used by the pilot, different current configurations of the systems and/or different outside conditions.

Each movement context of the aircraft 10 for example corresponds to one of its operating phases, such as the maintenance phase or one of the flight phases.

Functions implemented by at least some of the systems relative to a specific piloting purpose form an operational capacity $C_j$ of the aircraft 10. "Operational capacity" thus refers to a set of functions that, combined, form a capacity capable of offering a user one or a plurality of services provided by the aircraft 10, using the systems to accomplish a predetermined piloting aim. Each operational capacity $C_j$ is therefore implemented by one or several systems.

Depending on the case, at least one operational capacity $C_j$ is implemented by one or several functional chains.

For example, when the capacity must have strong availability, the associated functional chains are redundant chains, capable of replacing one another in case of failure.

When the capacity must have high integrity, the associated functional chains are capable of operating in a manner complementary to one another (i.e., operating in concert), one functional chain being able to control the operation of another functional chain associated with that capacity.

When the capacity must have both strong availability and high integrity, the associated functional chains have both redundancy and complementarity to operate in concert while remaining effective in case of failure of one of the functional chains.

When one or several functions forming an operational capacity $C_j$ are no longer available or partially available, for example following a malfunction of the system(s) corresponding to those services, the operational capacity $C_j$ is said to be lost or respectively downgraded (when the operational capacity is partially available).

The pilot of the aircraft 10 is able to recover, or compensate, a lost, respectively downgraded, operational capacity $C_j$ when a reconfiguration possibility exists making it possible to associate new services with that operational capacity $C_j$ to achieve the same piloting aim as before the failure appeared having caused the downgrade or loss of the operational capacity $C_j$.

Each reconfiguration possibility of an operational capacity $C_j$ is described in the form of a list of functional chains, each chain being capable by itself of carrying the complete or downgraded capacity.

Each operational capacity $C_j$ is chosen from the group including:
propulsion of the aircraft 10, also known as "Power Sources";
control of the speed of the aircraft 10, also known as "Speed Management";
control of the altitude of the aircraft 10, also known as "Alt Management";
control of the flight parameters of the aircraft 10, also known as "Flight Control";
surveillance of Icing Conditions;
control of approach categories of the aircraft 10, such as CAT2 or CAT3 DUAL known in themselves;
Required Navigation Performance (RNP);
Localizer Performance with Vertical Guidance (LPV);
Vertical Navigation (VNAV);
Instrument Landing (IL);
radar altimetric mode, also called RAD ALT Mode;
Reduced Vertical Separation Minima (RVSM);
minimum navigation performance specifications (MNPS);
communication with the ground or other aircraft via text messages (Datalink);
Satellite Communication (SatCom);
communication via high-frequency (HF) waves;
communication via very high-frequency (VHF) waves;
surveillance of the relief;
surveillance of air traffic;
surveillance of weather conditions;
surveillance and actuation of different control surfaces of the aircraft 10;
passenger information; and
control of the taxiing of the aircraft 10;
night vision, synthetic or enhanced.

The operational capacities $C_j$ of the aircraft 10 make it possible to perform operational tasks $T_i$ that can be done by the pilot to accomplish the mission M of the aircraft 10. "Operational task" thus refers to a set of capacities that the pilot is able to use directly on systems or indirectly via the systems to carry out the mission M.

When one or several operational capacities $C_j$ implementing an operational task $T_i$ are lost or downgraded, the operational task $T_i$ is said to be lost or incomplete.

The pilot of the aircraft 10 is able to recover a lost operational task $T_i$ when a reconfiguration possibility exists making it possible to associate new operational capacities $C_j$ to carry out that operational task $T_i$ and/or when it is possible to recover/complete the lost operational capacities $C_j$.

As in the preceding case, each reconfiguration procedure for an operational task $T_i$ for example contains a plurality of actions predetermined by the pilot on systems or on their configuration making it possible to reach such a combination.

Each operational task $T_i$ is chosen from the group consisting of:
- piloting of the aircraft 10 during flight including a set of capacities usable by the pilot to keep the aircraft 10 in flight, for example capacities to actuate the control stick or gas levers;
- localization of the aircraft 10 including a set of capacities usable by the pilot to localize the aircraft 10 in space;
- guidance of the aircraft 10 including a set of capacities usable by the pilot to guide the aircraft 10 along a predetermined route;
- communication of data between the aircraft 10 and the outside (for example, a control center, operator (e.g., airline) or other aircraft) consisting of the communication by the aircraft 10 with air traffic control including a set of capacities usable by the pilot to communicate with air traffic control, for example via radio communication means and/or consisting of the commercial communication of the aircraft 10 including a set of capacities usable by the pilot to commune with the airline or any structure defining the mission M of the aircraft 10; and
- observation of the environment surrounding the aircraft 10 including a set of capacities usable by the pilot in particular to avoid collisions in the air or with the ground.

The set of systems 11 comprises a system, called surveillance system and designated by reference 14, a system, called system for controlling the restitution of alert(s) and/or of system(s) reconfiguration procedure(s) and designated by reference 16, a system made in the form of a display monitor and designated by reference 18, a system made in the form of a mission manager and designated by reference 19, and other systems 20A to 20N. Only the systems 14, 16, 18 and 19 will be described in more detail later.

The surveillance system 14 is able to monitor the operation of the other systems 20A to 20N.

In particular, during the operation of the aircraft 10, the surveillance system 14 is able to assign each other system 20A to 20N the normal or faulty operating state to characterize the availability of that system 20A to 20N to carry out corresponding services.

To that end, as illustrated by FIG. 2 or 3, the surveillance system 14 is connected to the other systems 20A to 20N and able to receive and analyze the operating parameters of those systems 20A to 20N to determine their operating state, and the alert(s) and/or the associated reconfiguration procedure(s) to be restituted to the crew.

The operating state of a system is the normal state when the system is able to carry out all of the mandatory services for which it is designed.

The operating state of a system is the faulty state (i.e., downgraded) when the system is not able or is partially able to carry out at least some of the mandatory services for which it is designed, for example an intermittent indication of the position of the vehicle or with decreased precision.

The surveillance system 14 is for example a system of the FWS (Flight Warning System) type known in itself in the state of the art.

The system for controlling the restitution of alert(s) and/or of system(s) reconfiguration procedure(s) 16 is connected to the surveillance system 14 to receive the operating states of the systems 20A to 20N, the corresponding alert(s) and/or reconfiguration procedure(s), determined by the surveillance system 14, and to the display screen 18 in order to control and communicate, to the pilot, only the relevant alerts and/or reconfiguration procedures, or to associate, with the alerts or reconfiguration procedures, a relevant level L at which to be taken into account by the crew for the proper conduct of the mission M, based on the movement context of the aircraft 10.

For example, avionics alerts are categorized in six levels L, the maximum level indicating priority taking into account being equal to six, while the minimum level $L_{min}$ indicating possible filtering of the alert (i.e., non-restitution thereof to the crew) is equal to 1. In other words, any alert whose level L, after processing by the control system 16 according to the invention, is strictly less than two, is not able to be restituted to the crew in order to limit the latter's workload.

An alert with level $L_{max}=6$ for example corresponds to the type of avionics alert known under the name "Fly-related warning" and is calculated on all of the operational capacities for which one of the corresponding faulty systems 20A to 20N intervenes, an alert with level L=5 with alert type "Warning", an alert with level L=4 with alert type "Caution", an alert with level L=3 with alert type "Advisory" also called "Notification", an alert with level L=2 with alert type "Inhibited—see it Later".

The mission manager 19 is a computer able to store and analyze a set of information relative to the mission M of the aircraft 10. In particular, the mission manager 19 makes it possible to store a list of operational capacities $C_j$ required to carry out the mission M and send it to the control system 16.

In particular, such a list of operational capacities $C_j$ grouping together all or some of the aforementioned operational capacities $C_j$ for example follows directly from the current followed path, the flight phase, or the type of aircraft, and is updated continuously for each of the anticipated missions M.

For example, for a mission M flying over the ocean, for the communication functional capacity, the VHF communication function will be useful only near the departure or arrival airport, and for the rest of the mission time, the satellite communication function will be useful.

Furthermore, according to a first alternative embodiment, the mission manager 19 is capable of directly deducing (i.e., automatically without human intervention) the list of required operational capacities $C_j$ and their type, for each mission M, from data entered by at least one pilot from the crew via an entry interface, not shown, for example a MMI, for example accessible via a touch-sensitive display screen 18.

Optionally, the mission manager 19 is also capable of additionally providing the moment(s) t where each operational capacity $C_j$ is intended to be used. This moment t is for example described in relative time (i.e., as a function of a predetermined event, for example as a function of the position of the vehicle on the path) or in the form of a flight phase, for example.

According to a second alternative embodiment, the mission manager 19 is able to acquire part of the list of required operational capacities $C_j$, or the entire list of operational capacities $C_j$ entered directly and updated by the crew.

In connection with FIG. 2 or FIG. 3, from information provided respectively via the surveillance system 14 and via the mission manager 19, the control system 16 is capable of carrying out the method for controlling the restitution of alert(s) and/or of system(s) reconfiguration procedure(s) according to the invention.

In particular, the control system 16 is capable of obtaining the list of operational capacities $C_j$ required by the current mission M, and based on the required operational capacity or capacities, and from at least one piece of information stored in a database 22 accessible by the control system 16, the system 16 is also capable of:

modifying an associated level of alert(s) and/or of reconfiguration procedure(s) delivered by the surveillance system 14, and ordering the restitution for the crew of alert(s) and/or of procedure(s) based on said level, and/or filtering said alert(s) and/or reconfiguration procedure(s) before restitution to the crew.

More specifically, the control system 16 is capable of accessing the database 22. As described hereinafter in connection with FIGS. 4 and 5, in the database 22, each operational capacity $C_j$ is associated, by flight phase, with a list of groups of elements to which an alert A and/or a reconfiguration procedure P provided by the surveillance system 14 may relate.

Furthermore, to implement a modification of the associated level of alert(s) and/or of reconfiguration procedure(s) and/or a filtering of alert(s) and/or of reconfiguration procedure(s), the control system 16 is capable of detecting, within the database 22, the operational capacity or capacities $C_{j\_imp\_i}$ affected by the alert A or the reconfiguration procedure P, with i an affected operational capacity index.

Furthermore, in order to rank the alerts, or even to filter them relative to a predetermined alert level threshold $L_s$, the control system 16 is able to compare the or all of the affected operational capacities $C_{j\_imp\_i}$ with the required set of operational capacities for the current mission M on the one hand and with a set of basic operational capacities needed at all times for the proper operation of the aircraft 10 on the other hand, such as the "piloting", "navigation" or "communication" basic operational capacity or capacities.

Based on the result of these comparisons, able to be conducted by the control system 16 according to the invention by accessing the database 22, as described later in connection with the method according to the invention, the control system 16 is able to determine whether the alert A or reconfiguration procedure P level L determined by the surveillance system 14 is relevant with respect to the mission M in progress or whether a modification seeking to downgrade this level L by subtracting an integer k from it is necessary, the integer k being determined by the control system 16 by accessing a predetermined degradation law 24 specific to each alert and stored beforehand in a configuration file of the aircraft 10. More specifically, for a given alert, an amplitude of the number k is defined, per alert, by the degradation law 24. For example for an alert of the "Warning" type, regarding equipment that is required for the mission M and for the safety of the vehicle, in case of possible reconfiguration, the degradation law 24 for example indications a possible degradation of one level, and in case of impossible reconfiguration indicates an impossibility of degradation. For an alert of the "Caution" type, regarding equipment that is required for the mission M and for the safety of the vehicle, in case of possible reconfiguration, the degradation law 24 for example indications a possible degradation of three levels, and in case of impossible reconfiguration indicates a possible degradation of two levels.

According to an alternative that is not shown, the control system 16 further includes an entry interface allowing the crew to activate or deactivate it or to modulate its handling on the alert levels.

FIGS. 2 and 3 show schematic views of the different example embodiments of systems for controlling the restitution of alert(s) and/or of system(s) reconfiguration procedure(s) according to the invention.

In particular, in FIG. 2, the surveillance system 14 and the control system 16 are distinct and separate, for example in two separate units, not shown.

In the example embodiment of FIG. 3, the surveillance system 14 and the control system 16 are made in the form of a single piece of surveillance and control equipment 26 comprising, for example within a same unit, both hardware means configured to carry out the operation of the surveillance system 14 and the control system 16. In other words, according to this second embodiment associated with FIG. 3, the surveillance and control equipment 26 corresponds to an enriched Flight Warning System (FWS), or "super FWS", with a function for sorting and ranking alerts A and/or reconfiguration procedures P to be restituted for the crew based on their relevance in real-time relative to the mission M in progress.

According to one optional aspect, not shown in FIG. 2 or FIG. 3, the control system 16, irrespective of whether it is separate from the surveillance system 14, further includes a specific input capable of allowing the crew to modulate the alert A or the reconfiguration procedure P manually and/or to activate/deactivate the control system.

Figure 4:
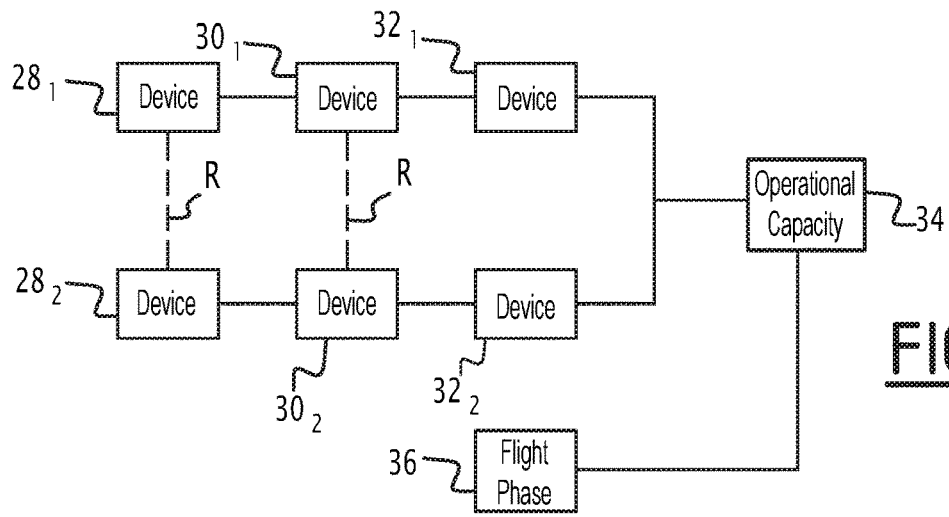
FIGS. 4 and 5 are schematic views of the organization of a database implemented according to the invention.
Figure 5:
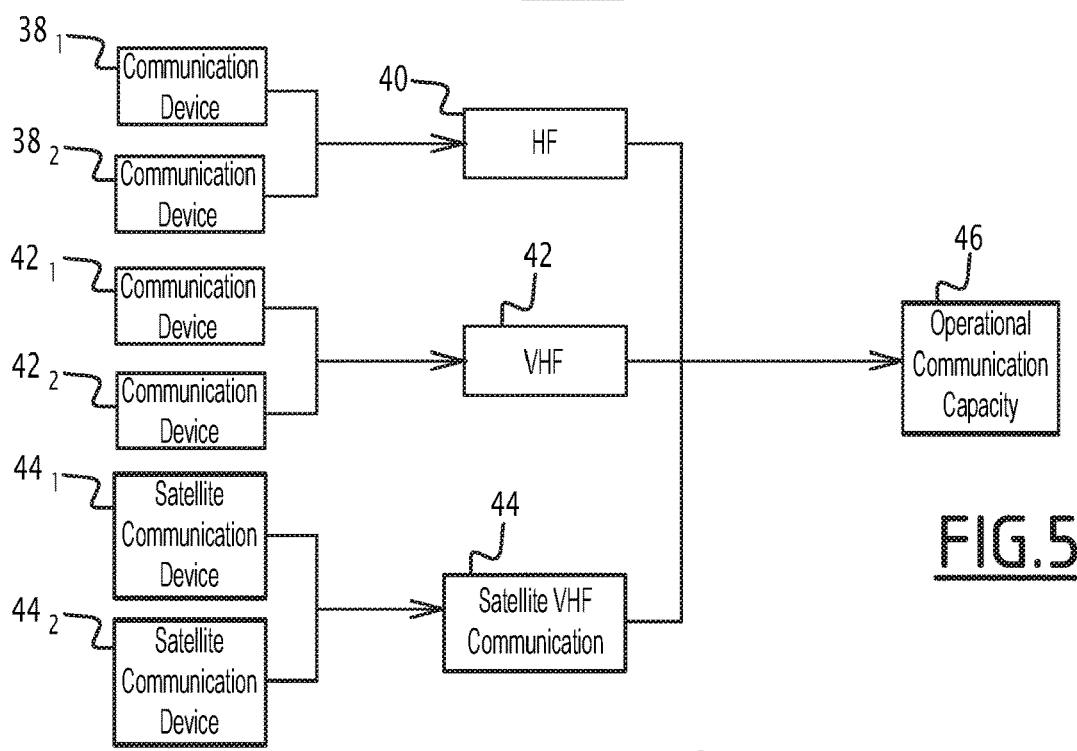

FIGS. 4 and 5 are schematic views of example combinations of elements in the database 22 implemented according to the invention.

In FIG. 4, a first chain of devices $28_1$, $30_1$ and $32_1$, and a second chain of devices $28_2$, $30_2$ and $32_2$ are respectively associated with a same operational capacity 34 corresponding to the Required Navigation Performance (RNP).

The devices $28_1$ and $28_2$ in particular each correspond to an Air Data Computer (ADC), the devices $30_1$ and $30_2$ each correspond to an Attitude Heading Reference System (AHRS), and the devices $32_1$ and $32_2$ each correspond to the Flight Management System (FMS).

In the database 22 accessible by the control system 16, the operational capacity 34 is associated differently with the aforementioned devices based on the flight phase 36.

For example, in a first case, the flight phase 36 is a descent phase, and in a second case, the flight phase 36 is an approach phase.

In the first case where the flight phase 36 is a descent phase, the operational capacity 34 corresponding to the required navigation performance is associated in the database 22 on the one hand with the first sub-group of elements including the first flight management system $32_1$, the two attitude heading reference systems $30_1$ and $30_2$ able to be connected to one another by a redundant link R (in dotted lines) so as to make them interchangeable, and the two air data computers $28_1$ and $28_2$ able to be connected to one another also by a redundant link R (in dotted lines) so as to make them interchangeable, and on the other hand the second sub-group of elements including the second flight management system $32_2$, the two attitude heading reference systems $30_1$ and $30_2$, and the two air data computers $28_1$ and $28_2$.

In particular, according to this first case where the flight phase 36 is a descent phase, and according to the combination above in the database 22, in case of alert A, delivered by the surveillance system 14, corresponding to a failure of the second flight management system $32_2$ and the attitude heading reference system $30_2$, by accessing the database 22, the control system 16 determines that the alert A affects the "RNP" operational capacity 34. The surveillance system 14 is also capable of delivering the status associated with the "RNP" operational capacity 34, i.e., "downgraded", to represent that a failure of this element is detected and to deliver the associated flight phase 36 corresponding to the descent phase of the aircraft 10.

If according to the present invention, the control system 16, after comparing the operational capacity 34 affected by the alert A to all of the operational capacities required for the mission M in the descent flight phase delivered by the mission management system 19, detects that the affected "RNP" operational capacity 34 is not required for the mission M, then the control system 16 is, according to the invention, capable of modifying the priority level of the alert A related to the second flight management system $32_2$ by decreasing it by a number k=2, this flight management system $32_2$ being critical for the capacity associated with the mission M but not very critical for safety when one considers the "worst-case scenario" obtained from the results of feared event and safety analyses. Furthermore, the control system 16 is capable of modifying the priority level of the alert A related to the second attitude heading reference system $30_2$ by decreasing it by a number k=1, the second attitude heading reference system $30_2$ being more critical for safety when one considers the "worst-case scenario" than the flight management system $32_2$.

If, on the contrary, this affected operational capacity 34 is required for the mission M and the aircraft 10 is in the approach flight phase 36 and not the descent flight phase 36, the control system 16 is, according to the invention, capable of modifying the priority level of the alert A respectively related to the second flight management system $32_2$ and the second attitude heading reference system $30_2$ so as to decrease it so that it becomes lower than a predetermined alert level L threshold $L_S$, for example $L_S$=2, such that the alert A relative to the second flight management system $32_2$ or the second attitude heading reference system $30_2$ is filtered (i.e., not restituted on the screen 18 for the crew).

In the second case where the flight phase 36 is an approach phase, the two attitude heading reference systems $30_1$ and $30_2$, as well as, respectively, the two air data computers $28_1$ and $28_2$, are not able to make one another redundant during this approach flight phase 36.

In other words, the redundancy links R between attitude heading reference systems $30_1$ and $30_2$ on the one hand and between the two air data computers $28_1$ and $28_2$ on the other hand are deactivated in this second case when the flight phase 36 is an approach phase and activated in the first case when the flight phase 36 is a descent phase. In the approach phase, the two attitude heading reference systems $30_1$ and $30_2$ and the two air data computers $28_1$ and $28_2$ are required, each of these pieces of equipment being capable of controlling itself so as to detect inconsistencies, like an operation in dual source mode.

Furthermore, the operational capacity 34 corresponding to the required navigation performance is then associated in the database 22 on the one hand with the first sub-group of elements including the first flight management system $32_1$, the first attitude heading reference system $30_1$ and the air data computer $28_1$, and on the other hand the second sub-group of elements including the second flight management system $32_2$, the second attitude heading reference system $30_1$ and $30_2$, and the second air data computer $28_2$.

According to this second case, and in case of alert A corresponding to a failure of the second flight management system $32_2$ and the second attitude heading reference system $30_2$, but also a failure of the first flight management system $32_1$ and the first attitude heading reference system $30_1$, the surveillance system 14 is capable of delivering that the status associated with the "RNP" operational capacity 34 is "lost" because there is no possibility of recovering the "RNP" operational capacity 34 (i.e., because no possible redundancy in this case). According to the present invention, the control system 16, determining that the "RNP" operational capacity 34 is required for the mission M and that the aircraft 10 is indeed in the approach flight phase 36, the priority level of the alerts related to the second flight management system $32_2$ or the second attitude heading reference system $30_2$ will be kept at its maximum level so that the crew handles it as a priority.

In the database 22, the other operational capacities $C_j$ are associated in the same way with a list of groups of elements to which the alert A and/or the reconfiguration procedure P to be restituted according to the surveillance system 14 may relate.

FIG. 5 in particular illustrates the association stored within the database 22 related to the operational communication capacity of the aircraft 10 corresponding to a basic capacity, necessary at all times for the proper operation of the aircraft 10, i.e., the air/ground operational communication capacity.

In particular, two redundant communication devices $38_1$ and $38_2$ via high-frequency (HF) waves are associated with the HF communication operational capacity 40, two redundant communication devices $42_1$ and $42_2$ via very high-frequency (VHF) waves are associated with the VHF communication operational capacity 42, and two redundant satellite communication devices $44_1$ and $44_2$ are associated with the satellite communication VHF communication 44 operational capacity 42.

In case of alert A corresponding to a failure of the first communication device $38_1$, if the required operational capacity for the mission M is the VHF communication operational capacity 42 and not the HF communication operational capacity 40, according to the present invention, the control system 16 is capable of modifying the priority level of the alert A by decreasing it by a number k=1 so as for example to go from an alert level L=4 of the "Caution" type to an alert level L=3 of the "Advisory" type.

The method 48 for controlling the restitution of alert(s) and/or of system(s) reconfiguration procedure(s) will now be described in reference to FIG. 6 illustrating a flowchart of its steps for a current mission M.

As previously indicated in connection with FIGS. 2 and 3, the method is carried out by a control system 16 capable of being connected, within a same unit 26 or not, the surveillance system 14, which in turn is connected to the assembly 50 of other systems 20A to 20N, but also to the mission manager 19, optionally associated with an entry interface in a same assembly 52.

During a step 54, the surveillance of the operation of one or several avionics device(s) of the assembly 50 of the aircraft 10 and the determination of alert(s) and/or of associated reconfiguration procedure(s) to be restituted for the crew is carried out.

In other words, this step amounts to calculating alerts and current flight contexts (i.e., movement context of the aircraft), and the state of the avionics device(s) 50 of the airplane based on combinations of mathematical and logic operators, the result of this calculation next being provided as the input of a control step 56 for the restitution 60 of alert(s) and/or of avionics procedure(s).

Furthermore, independently, for example, in parallel, beforehand or successively, the method includes a step 58 for obtaining the list of operational capacities $C_j$ required by the current mission M, this list being provided by the mission manager 19, for example associated in the assembly 52 with an entry interface allowing a manual selection by the crew, at the input of the step 56 for controlling the restitution 60 of alert(s) and/or of avionics procedure(s).

From information delivered by these two steps 54 and 58, namely respectively alert(s) A, reconfiguration procedure(s) P, current flight context(s) on the one hand and operational capacity or capacities $C_j$ required by the current mission M on the other hand, the step 56 for controlling the restitution 60 of alert(s) and/or of avionics procedure(s) is therefore carried out.

More specifically, according to this step, the sorting/presentation of alerts A and/or of reconfiguration procedures P based on capacities required for the mission M is carried out. According to this step 56, access is carried out to the database 22 described previously and containing:

- for each alert A and procedure P, its "worst-case scenario" and "minimal case" characteristics in terms of priority and criticality, pilot load associated with each procedural item,
- for each operational capacity of the aircraft 10, the lists of groups of alerts that may cause the loss of operational capacity, each list resulting from the safety analysis of the aircraft 10, and
- for each basic operational capacity $C_B$ of the aircraft, the lists of groups of alerts that may cause the loss of such a basic capacity, each list also resulting from the safety analysis of the aircraft 10.

Optionally, not shown, the moment(s), in terms of flight phase or positioning on the path, where each operational capacity is intended to be used is also taken into account at the input of step 56 for controlling alert restitution.

More specifically, such a step 56 for controlling restitution amounts to modifying the associated level L of alert(s) and/or of reconfiguration procedure(s) derived from the surveillance 54, and sequencing the restitution for the crew of alert(s) and/or of procedure(s) based on said level L, and/or amounts to filtering alert(s) and/or reconfiguration procedure(s) before restitution to the crew.

Furthermore, in order to modify (i.e., downgrade, decrease) the alert A and/or reconfiguration procedure level L, the system 16 for controlling restitution accesses a configuration file containing a degradation law used to determine the downgraded alert level L, or the possible amplitude of the downgraded alert level L.

Such a degradation law 24 for example corresponds to the application of the following match and analysis table:

| Cj required for mission M | | |
|---|---|---|
| required for safety considering the "worst-case scenario" situation obtained from results of feared events and safety analyses (including outside mission) | k = 1 | k = 0 |
| for Optimization/optional | k = 2 | k = 1 |
| not required for the rest of the mission | k = 3 | k = 2 |
| Status of the operational capacity delivered by the surveillance | Downgraded - reconfiguration possible | Permanent loss |

According to this example, the downgrade is weighted based on the status of the operational capacity delivered by the surveillance.

For example, when, at the end of the surveillance step 54, the alert A or the reconfiguration procedure P associated with an operational capacity required for the safety of the mission M and associated with the "downgraded" status is delivered, the alert or associated reconfiguration procedure level is able to be downgraded from one level to the maximum.

Likewise, when, at the end of the surveillance step 54, the alert A or the reconfiguration procedure P associated with an operational capacity required for the mission M and associated with the "permanent loss" status is delivered, the alert or associated reconfiguration procedure level is able to be preserved.

The downgrade by decrease by an integer k is such that $L-k \geq L_{min}$.

Alternatively, such a law can also take into account the moment of use of the operational capacity, in light of the moment $t_c$ of implementation of the method 48 according to the present invention. In other words, the law takes account of the flight phase or the position of the vehicle on the path (such a position being associated with a moment) where the use of the operational capacity is required, and when the operational capacity is no longer required for the rest of the mission, another part of the degradation law 24 or another degradation law is applied for the progression of the rest of the mission.

In relation to FIG. 7, the implementation, at a moment $t_c$, via logic comparison operators of step 56 for controlling alert restitution 60, is described in detail below.

More specifically, during step 56, a step 62 for going through the database 22 is carried out by the restitution control system 16. This step 62 amounts to detecting 62 the operational capacity or capacities $C_{j\_imp}$ (i.e., the lost or downgraded capacity or capacities) affected by the alert A and/or by the reconfiguration procedure P whereof restitution is recommended by the surveillance system 14.

Then, according to a step 64, for each lost or downgraded operational capacity $C_{j\_imp\_i}$, with i an affected operational capacity index, a comparison to all of the operational capacities $C_j$ required for the mission M, provided by the mission manager 19, is done.

If this comparison 64 is negative N, a step 66 for decreasing (i.e., downgrading) the level L of alert(s) A and/or of reconfiguration procedure(s) resulting from the surveillance, by applying the predetermined degradation law 24 stored beforehand in a configuration file of the aircraft 10. In other words, according to this decrease done at a moment $t_{c+1}$, the alert level $L_{tc+1} = L_{tc} - k$, k being defined in accordance with the degradation law 24.

According to the embodiment of FIG. 7, if the comparison 64 is positive Y, the operational capacity $C_{j\_imp\_i}$ lost or downgraded during analysis is next, according to a step 68, compared to a set of basic operational capacities necessary at all times to the proper operation of the aircraft 10. If the operational capacity $C_{j\_imp\_i}$ is identified as basic (i.e., "basic" means required for all missions) Y in the database 22 (for example corresponding to the propulsion of the aircraft 10 in the case of an airliner), according to a step 70, the level $L_{tc}+1$ associated with the alert A or the reconfiguration procedure P is retained. In other words, between the input moment $t_c$ and the output moment $t_{c+1}$ of the restitution control step 56, the restitution priority level L will remain unchanged (i.e., $L_{tc+1} = L_{tc}$).

Conversely, if the second comparison 68 is negative (i.e., the operational capacity $C_{j\_imp\_i}$ lost or downgraded during analysis is not basic, but necessary for the mission M), according to a step 72, it is evaluated whether the operational capacity $C_{j\_imp\_i}$ lost or downgraded during analysis is required independently of the time Y, in which case according to step 70, the level $L_{tc+1}$ associated with the alert A or the reconfiguration procedure P is preserved, or not N, in which case during two steps 74 and 76, it is evaluated whether the operational capacity $C_{j\_imp\_i}$ lost or downgraded during analysis is necessary for the mission before the moment $t_c$ of entry into the step 56 for controlling restitution or later.

Thus, if the operational capacity $C_{j\_imp\_i}$ is required for the mission M but in a future period of time ($t > t_c$) as tested according to step 74, the level L is preserved according to step 70. If not N, if the operational capacity $C_{j\_imp\_i}$ is required for the mission M but in a completed period ($t < t_c$), the level L is downgraded according to a step 78 according to the degradation law 24 defined in the configuration file, such that the alert level $L_{tc+1} = L_{tc} - k$.

One can thus see that the present invention proposes, before the restitution to the crew, a ranking and filtering of the alerts and reconfiguration procedures according to the operational context of the aircraft, making it possible, over time, to obtain a reduction in the stress of the crew by offering the latter the possibility of prioritizing tasks more easily and therefore also reducing the burden associated with the processing of said tasks.

The invention claimed is:

1. A method for controlling a restitution of at least one element belonging to the group comprising at least alerts and system reconfiguration procedures, the method including surveillance of an operation of one or several devices of a vehicle configured to move between two distinct points and the determination of said at least one element to be restituted for a crew or for at least one pilot of the vehicle, the vehicle being configured to operate according to at least one mission selected from among a plurality of missions, the mission corresponding to a sequence of operational tasks carried out by using at least one operational capacity associated with said mission, wherein the method further includes, for a current mission, the following steps:
obtaining a list of operational capacities required by said current mission;
based on said required operational capacities, and from at least one piece of information stored in an accessible database, controlling the restitution of said at least one element belonging to the group comprising at least alerts and system reconfiguration procedures by performing at least one step belonging to the group of steps comprising at least:
modifying an associated level of said at least one element derived from the surveillance, and sequencing the restitution for the crew of said at least one element based on said level, and
filtering said at least one element before restitution to the crew.

2. The method according to claim 1, wherein, in the database, each operational capacity is associated, by flight phase, with a list of groups of elements to which an alert or a reconfiguration procedure may relate, the modification or the filtering including:
detecting the operational capacity or capacities affected by the alert or by the reconfiguration procedure,
a first comparison of said affected operational capacities to said required operational capacity or capacities, and
a second comparison of said affected operational capacities to a set of basic operational capacities continuously required for the proper operation of the vehicle.

3. The method according to claim 2, wherein when the first comparison of said affected operational capacities to said required operational capacity or capacities is negative, the method includes decreasing the level of alerts or of reconfiguration procedures derived from the surveillance, by applying a predetermined degradation law stored beforehand in a configuration file of the vehicle.

4. The method according to claim 2, wherein when the first comparison of said affected operational capacities to said required operational capacity or capacities is positive, and when the capacity or capacities both affected and required are independent of the current moment of the mission, a conservation of the level of alerts or of reconfiguration procedures is implemented.

5. The method according to claim 2, wherein the database further includes, for each operational capacity, information representative of its usage period during the current mission, and in which the method includes taking this information into account to control the restitution of alerts or of avionics procedures.

6. The method according to claim 5, wherein when the first comparison of said affected operational capacities to said required operational capacity or capacities is positive, and when, at a current moment, the information representative of the usage period of the capacity or capacities both affected and required indicates a usage after the current moment during the mission, a conservation of the level of alerts or of reconfiguration procedures is implemented.

7. The method according to claim 5, wherein when the first comparison of said affected operational capacities to said required operational capacity or capacities is positive, and when, at a current moment, the information representative of the usage period of the capacity or capacities both affected and required indicates a completed usage relative to the current moment, the method includes decreasing the level of alerts or of reconfiguration procedures derived from the surveillance, by applying a predetermined degradation law stored beforehand in the configuration file of the vehicle.

8. The method according to claim 2, wherein when the second comparison of the affected operational capacities to a set of basic operational capacities is positive, a conservation of the level of alerts or of reconfiguration procedures is carried out.

9. A non-transitory computer program product comprising software instructions which, when implemented by a piece of computer equipment, carry out the method according to any one of the preceding claims.

10. A system for controlling a restitution of at least one element belonging to the group comprising at least alerts and system reconfiguration procedures, the system being connectable to a system for surveillance of an operation of one or several devices of a vehicle configured to move between two distinct points, the system for surveillance of the operation being configured to carry out the determination of said at least one element to be restituted for a crew or at least one pilot of the vehicle, the vehicle being configured to operate according to at least one mission selected from among a plurality of missions, a mission corresponding to a sequence of operational tasks carried out by using at least one operational capacity associated with said mission, wherein, for carrying out a current mission, the control system is configured to:
obtain a list of operational capacities required by said current mission;
based on said required operational capacity or capacities, and from at least one piece of information stored in a database accessible by the control system, the system is also configured to:

modify an associated level of said at least one element delivered by the surveillance system, and ordering the restitution for the crew of said at least one element based on said level, and filtering said at least one element before restitution to the crew.

\* \* \* \* \*